United States Patent
Datta et al.

(10) Patent No.: US 7,877,510 B2
(45) Date of Patent: Jan. 25, 2011

(54) DOMAIN NAME RESOLUTION MAKING IP ADDRESS SELECTIONS IN RESPONSE TO CONNECTION STATUS WHEN MULTIPLE CONNECTIONS ARE PRESENT

(75) Inventors: Sanchaita Datta, Salt Lake City, UT (US); Bhaskar Ragula, Salt Lake City, UT (US)

(73) Assignee: FatPipe Networks India Limited, Chennai (IN)

( * ) Notice: Subject to any disclaimer, the term of this patent is extended or adjusted under 35 U.S.C. 154(b) by 106 days.

(21) Appl. No.: 12/410,531

(22) Filed: Mar. 25, 2009

(65) Prior Publication Data

US 2009/0182884 A1      Jul. 16, 2009

(51) Int. Cl.
   *G06F 15/173* (2006.01)
(52) U.S. Cl. .................. 709/239; 709/238; 709/224; 709/203
(58) Field of Classification Search ......... 709/223–224, 709/203, 238–239, 241
   See application file for complete search history.

(56) References Cited

U.S. PATENT DOCUMENTS

| | | | | |
|---|---|---|---|---|
| 5,774,660 A | * | 6/1998 | Brendel et al. | 709/203 |
| 6,006,264 A | * | 12/1999 | Colby et al. | 709/220 |
| 6,119,143 A | * | 9/2000 | Dias et al. | 709/203 |
| 6,304,913 B1 | * | 10/2001 | Rune | 709/241 |
| 6,389,462 B1 | * | 5/2002 | Cohen et al. | 709/239 |
| 6,665,702 B1 | * | 12/2003 | Zisapel et al. | 709/238 |
| 6,779,039 B1 | * | 8/2004 | Bommareddy et al. | 709/238 |
| 2001/0049741 A1 | * | 12/2001 | Skene et al. | 709/232 |

OTHER PUBLICATIONS

Notification of Identification of Prior Art in Late Protest Under 37 C.F.R. § 1.291, mailed Aug. 3, 2010, pp. 2.
Ronald B. Thomas, Ecessa Corporation, "Pending Patent Protest Letter", USPTO stamped May 17, 2010, pp. 2.
Statement of John gilvie, Aug. 3. 2010, pp. 1.
Notification of Identification of Prior Art in Late Protest Under 37 C.F.R. § 1.291, mailed Jul. 20, 2010, pp. 1.
Daren French, "Protest", USPTO stamped Feb. 12, 2010, pp. 1.

* cited by examiner

*Primary Examiner*—Philip B Tran
(74) *Attorney, Agent, or Firm*—Ogilvie Law Firm

(57) ABSTRACT

Methods, configured storage media, and systems are provided for resolving domain names into IP addresses in a path-sensitive manner, namely, a manner that may consider information about a link to a server and/or information about routers and other path components. The IP addresses given in response to domain name resolution requests are selected to provide increased reliability and/or dynamic load-balancing over paths.

20 Claims, 3 Drawing Sheets

DOMAIN NAME RESOLUTION MAKING IP ADDRESS SELECTIONS IN RESPONSE TO CONNECTION STATUS WHEN MULTIPLE CONNECTIONS ARE PRESENT

RELATED APPLICATIONS

This application claims priority to commonly owned U.S. provisional patent applications Ser. No. 60/258,946 filed Dec. 29, 2000, Ser. No. 60/273,598 filed Mar. 6, 2001, and Ser. No. 60/339,182 filed Dec. 10, 2001, each of which is also incorporated herein by reference.

FIELD OF THE INVENTION

The present invention relates to the translation of domain names to IP addresses in a computer network, and more particularly relates to tools and techniques for distributing domain name resolution results among multiple connections, to provide benefits such as dynamic load-balancing across network connections and greater reliability.

TECHNICAL BACKGROUND OF THE INVENTION

All computers on the Internet use a TCP/IP protocol for communication. An IP address or a name, or both, identify the web sites/computers connected to the Internet—both servers and clients. For example, the Ragula Systems web site can be identified by its domain name www.fatpipeinc.com or by its IP address 206.71.77.143 (FATPIPE is a mark of Ragula Systems, which does business as FatPipe Networks). Computers on virtual private networks, on other wide area networks, on intranets, and on other networks also use TCP/IP. As a general rule the name of the web site on any of these networks tends to remain constant while the IP address associated with it can change based on the IP address(es) of the server(s) on which the site is hosted.

Communication between the computers uses TCP/IP protocol to access the web site data. Therefore, it is necessary to convert the domain name of the web site to the IP address of a server of the web site. Domain Name Service (DNS) servers connected to the web/Internet perform the conversion of name to IP address using a DNS protocol; this conversion is call "domain name resolution". A domain name resolution request is a request for an IP address that corresponds to a given domain name; more than one IP address may correspond to a given domain name if the web site named is heavily used. An Internet Service Provider (ISP) may provide the IP address of a DNS server to its customers. This DNS IP address is input in the configuration of the TCP/IP stack on the computer connecting to the Internet and may be input to a Dynamic Host Configuration Protocol (DHCP) server so that it can provide TCP/IP auto-configuring information to other computers. Requests from customers for access to a web site are directed to the DNS server, which resolves the domain name in the request to obtain a corresponding IP address that can be used by routers to forward the web site access request to a server for the web site.

U.S. Pat. No. 6,154,777 discusses a context-dependent name resolution system. In one example, a domain name is bound to a list of IP addresses, and policies involving requester information, destination information, or request content are used to bind a particular IP address to the domain name in response to a particular request. Examples of resolution based on requester information comprise resolution based on the domain name of the sender, the actual geographic region of the sender, the quality of service desired by the requester, or the requester's time of day or time zone. Examples of resolution based on destination information comprise resolution based on the load at the receiving server, or the actual geographic region of the receiver. Examples of resolution based on request content comprise selecting an IP address based on the type of service requested or the specific information requested. This patent also states that resolution may be based on random selection of the destination from a qualified list, and other independently developed information.

In particular, the '777 patent discusses domain name resolution based on destination server loads. But there is apparently no discussion of basing domain name resolution results on the load or availability of routers or connections to destination servers, as opposed to using the status of the servers themselves. U.S. Pat. No. 6,205,489 similarly focuses on web servers rather than the routers and other connection components in paths to the servers. The same holds true of other previous efforts.

Accordingly, it would be an advancement to provide domain name resolution tools and techniques that provide IP addresses based on criteria such as router loads and connection availability. Such tools and techniques are discussed and claimed below.

BRIEF SUMMARY OF THE INVENTION

The present invention provides connection-sensitive domain name resolution tools and techniques. One embodiment provides a connection-sensitive domain name resolution device that comprises a data component identifying IP addresses for at least two paths to a server which has a domain name; and a code component which receives a domain name resolution request specifying the domain name, selects an IP address from the data component based on information about the status of a path to the server, and supplies the selected IP address in response to the domain name resolution request. In particular embodiments and/or situations, the IP addresses may identify routers, firewalls, bridges, and/or other path components. The information about path status may include device status, link status, link bandwidth, latency, and/or other path statistics or characteristics. Thus, in a particular situation a particular connection-sensitive domain name resolution device may, for instance, avoid selecting the IP address of a router that is on a path to the server but is not available. It may select the IP address in a round-robin manner by selecting the next IP address in a list of IP addresses of routers that are on paths to the server and are available when the selection is made. It may select the IP address of an under-loaded path, thereby tending to balance the loads on the paths to the server. Various other configuration changes are also contemplated. The connection-sensitive domain name resolution device may be placed between the server and a router for the server, or not. It may have multiple connections to the server or to the Internet, or it may not. It may assist dynamic load-balancing over server paths and also perform load-balancing over multiple servers, or not.

A method of the invention for distributing domain name resolution results over multiple paths comprises the steps of: receiving a domain name resolution request which requests an IP address corresponding to a specified domain name; determining that at least one candidate connection component is operating reliably and thus is a reliable connection component, the reliable connection component being in a path to a server having the domain name, the reliable connection component having an IP address; and supplying the IP address of the reliable connection component in a response to the resolution request, thereby directing traffic to the server over a path through the reliable connection component. Another method further comprises the steps of determining the load on at least one candidate connection component and selecting a connection component which is not over-loaded, the selected connection component having an IP address and being in a path to the server having the domain name, wherein the supplying step comprises sending the IP address of the selected connection component in a response to the resolution request, thereby directing traffic to the server over a path through the connection component that is both reliable and not over-loaded. Some methods comprise adjusting the time-to-live to be associated with a DNS record for an IP address in a path to the server. Some methods ping a router or other connection component on a path to the server to determine if it is a reliable connection component. Some methods perform a router status inquiry to determine the router's load.

A computer-readable storage medium of the invention has a configuration that will cause performance of a method for connection-sensitive domain name resolution when multiple connections to a web server are potentially available. The method comprises: receiving a DNS resolution request; selecting an IP address based on connection component status; and supplying the selected IP address in response to the request. In some embodiments, wherein the selecting step comprises determining whether a connection responds to pings, selecting an IP address of the next available path in a round-robin manner, and/or determining whether a router or other connection component is under-loaded. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and its context. In the drawings.

DETAILED DESCRIPTION OF THE PREFERRED EMBODIMENTS

The present invention relates to methods, systems, and configured storage media for providing redundancy and load-balancing in systems that have multiple (two or more) connection paths to a domain-named server. Existing approaches balance loads and track availability based on server status. By contrast, the present invention balances loads and tracks availability based on connection component (links, routers, switches, bridges, firewalls, packet shapers, etc.) status. Those prior approaches are not a substitute for the present invention, or vice versa. Rather, the invention's path-sensitive approach and prior server-sensitive approaches complement one other, since they may provide more flexibility, efficiency, and reliability when used together than either would provide alone.

Figure 1:
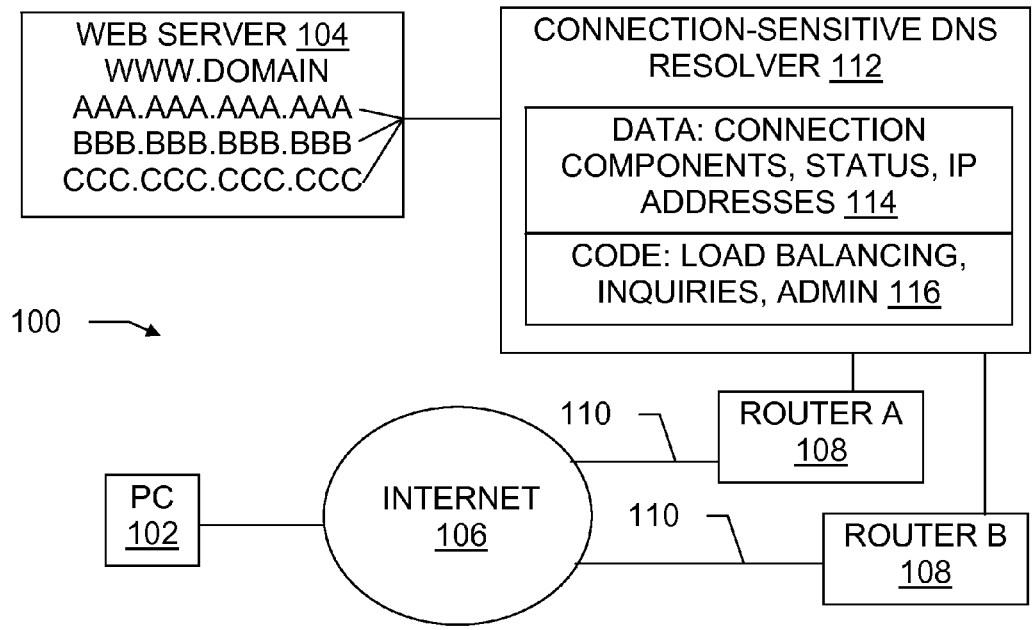
FIG. 1 is a diagram illustrating a system according to the invention, comprising a web server having multiple IP addresses, which is made accessible to a personal computer for Internet browsing by way of multiple routers and an inventive connection-sensitive DNS resolver that selects IP addresses for access to the server using connection status as a dispositive criterion.

FIG. 1 illustrates a system 100 according to the present invention. A client PC 102 seeks access to a web server 104 which is identified by the client 102 using a domain name. Other types of servers 104, such as FTP servers, list servers, and the like, may be likewise utilized in systems according to the invention. The client 102 seeks access to the server 104 over the Internet 106. "Internet" as used herein includes variations such as a private Internet, a secure Internet, a value-added network, a virtual private network, or an intranet. The computers connected in the system 100 may be clients 102, servers 104, peers, or a combination thereof. Suitable network clients 102 include, without limitation, personal computers, laptops, workstations, and dumb terminals. PC 102 may be, for instance, a personal computer browsing the Internet 106 with a browser such as a Netscape or Microsoft browser, or a personal computer using an intranet connection or a thin client application.

The servers 104 and their clients 102 are generally capable of using floppy drives, tape drives, optical drives and/or other means to read a storage medium. A suitable storage medium includes a magnetic, optical, or other computer-readable storage device having a specific physical substrate configuration. Suitable storage devices include floppy disks, hard disks, tape, CD-ROMs, DVDs, PROMs, ROM, RAM, flash memory and other computer system storage devices, both volatile and non-volatile. The substrate configuration represents data and/or instructions which cause the computer to operate in a specific and predefined manner as described herein. Thus, the medium tangibly embodies a program, functions, data, and/or instructions that direct a computer to perform or provide improved DNS path-sensitive name resolution techniques and tools according to the present invention.

To permit redundancy and load-balancing, the system 100 includes multiple connection paths between the server 104 and the Internet 106. One connection path goes over a first router ("router A") 108 and network links 110, while another path goes over another router ("router B") 108 and other links 110. The signal lines used in the links 110 may include twisted pair, coaxial, or optical fiber cables, telephone lines, satellites, microwave relays, modulated AC power lines, and other data transmission "wires" known to those of skill in the art, including wireless links. Signals according to the invention may be embodied in such "wires" and/or in addressable storage media.

A connection-sensitive DNS resolver 112 is positioned between the routers 108 and the server 104. The connection-sensitive DNS resolver 112 operates generally like a conventional (server-sensitive) DNS resolver in that both types of DNS resolver provide redundancy and both preferably perform some load-balancing. But a conventional DNS resolver selects IP addresses to provide based on the server's status, whereas the inventive DNS resolver 112 selects IP addresses based on connection/router status. This may lead to different outcomes, depending on the situation. For instance, when two paths to a server are available, a conventional DNS resolver may over-load one of the paths without necessarily overloading the server. Likewise, when two paths are available to each of two servers, a connection-sensitive DNS resolver might over-load one of the servers even though it has distributed the load between the two paths.

The illustrated DNS resolver 112 comprises a data component 114 and a code 116 component. The data component 114 contains information identifying the connection components, e.g., routers 108, links 110, and—at least implicitly—their network topology (which links connect to which routers, etc.). In some embodiments, additional detail is stored, such as the bandwidth and/or latency of a link 110, the processing speed and/or buffer size of a router 108, and other performance characteristics. The data component 114 may also contain status information, such as whether a router 108 answered a ping, when the router 108 was last pinged, whether the carrier signal is present for a link 110, whether packets sent to a given link 100 or router 108 have apparently been dropped (no ack received before timeout), the time it took to receive a reply to a request sent on a link, and so on. Finally, the data component 114 contains IP addresses for the paths, with an implicit or express indication of which IP addresses correspond to which routers 108. Note that in some embodiments and/or situations, more than one IP address can be handled by a given router 108. Particular embodiments of the data component 114 may contain various data elements, organized into lists, tables, and/or other data structures. But in general, the data component 114 contains at some point enough data for the DNS resolver 112 to select an IP address based on at least data about the apparent availability of different paths, and preferably based on data about the relative loads on different paths.

The code component 116 receives the domain name resolution request, accesses and/or obtains the data 114 to make an IP address selection, and provides the selected IP address in response to the domain name resolution request. The IP address is selected based on the status of path elements, such as routers 108 and possibly also links 110, where the path element status is defined in terms of path characteristics such as the speed of the link, the load on a link, the hop count between the requester and the resolver, and/or fixed load distribution. Additional criteria may also be considered, such as a pre-defined criterion based on geographic location of the requester. The selection should be made, at a minimum, by selecting an IP address for a path that is apparently (based on the data 114) currently available to carry packets. The selection of an IP address is preferably made in a way that balances loads between two or more available paths, based on criteria such as the relative load on different routers 108 and/or the bandwidth of different links 110. The code component 116 may thus include code for pinging routers or making other status inquiries of path elements. In some embodiments, the code 116 includes procedures to aid administration (preferably including remote management through SNMP or the like), such as code for maintaining logs, sending alerts to system administrators, authentication and security code, and code to set parameters such as the time-to-live of DNS resolution responses. The time-to-live is provided with the IP address in the DNS resolver's response. Use of the term "code" here reflects the fact that implementing code component 116 functionality in software, firmware, microcode, or other programmable code configuring general-purpose hardware is often preferred, because it makes upgrades and other changes easier, but the code component 116 may also be implemented partially or entirely in special-purpose hardware.

Figure 2:
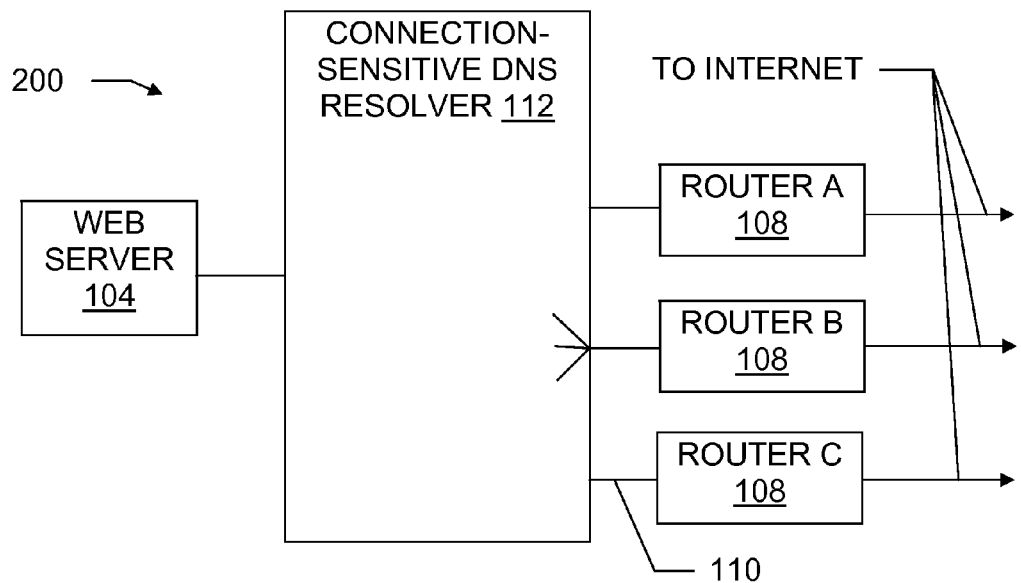
FIG. 2 is a diagram illustrating an alternative system according to the present invention, in which the connection-sensitive DNS resolver has several assigned IP addresses.

FIG. 2 illustrates a system 200, in which the connection-sensitive DNS resolver 112 has several assigned IP addresses. That is, one IP address leads to the resolver 112 and hence to the web server 104 by way of router A, three IP addresses lead to the resolver 112 and thence to the server 104 through router B, and one IP address leads to the resolver 112 and server 104 through router C. Depending on the circumstances, it may be preferable to have multiple addresses at the server, multiple addresses at the resolver 112, neither, or both. For instance, the resolver 112 may be added to an existing configuration in which a server 104 is up and running well. Suppose the server has a single IP address. Adding another address to the server for multi-homing would require changing server settings, which increases risk that the server will stop functioning as desired. Therefore, it may be preferable to leave the server with a single address and add an IP address at the resolver 112 for multi-homing—the resolver 112 then maps its multiple addresses to the single server address. Alternately, suppose the server is already multi-homed and already running well when the resolver 112 is to be added. It may then be preferable to give the resolver 112 a single IP address and let the server continue with its multiple addresses, which the resolver can map traffic to.

Figure 3:
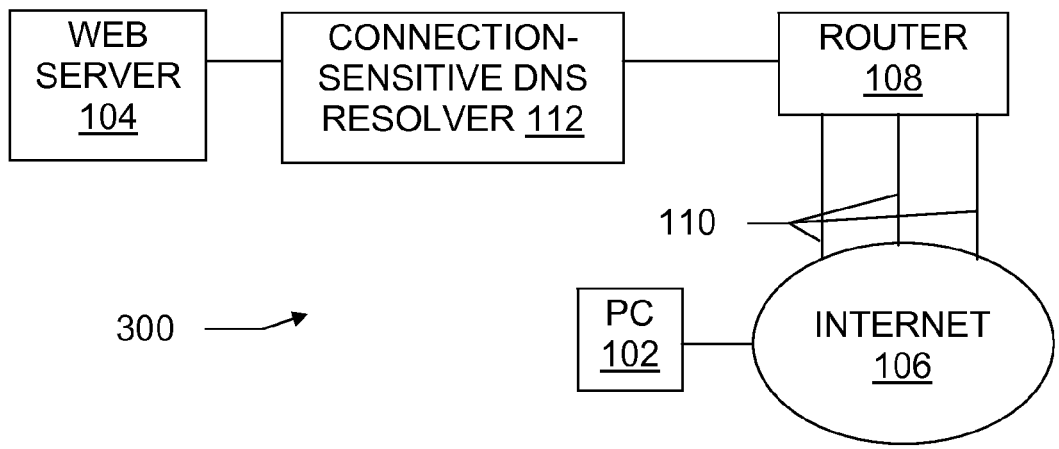
FIG. 3 is a diagram illustrating an alternative system according to the present invention, in which a single router is used but that router has multiple connections to the Internet.

Note that multiple paths can be present in various ways. FIG. 1 shows two routers 108, each with its own link 110 to the resolver 112 and its own link to the Internet 106. FIG. 2 shows more routers 108 (three, this time), again with each router 108 having its own link 110 to the resolver and its own link 110 to the Internet 106. FIG. 3 shows a system 300 in which a single router 108 has one link 110 to the resolver 112 but has three links 110 to the Internet 106. Other combinations of routers and links are also possible in some systems according to the invention. An embodiment of the inventive DNS resolver 112 may be used if multiple paths to a server 104 are possible, regardless of how those paths are formed from links 110 and routers 108.

Figure 4:
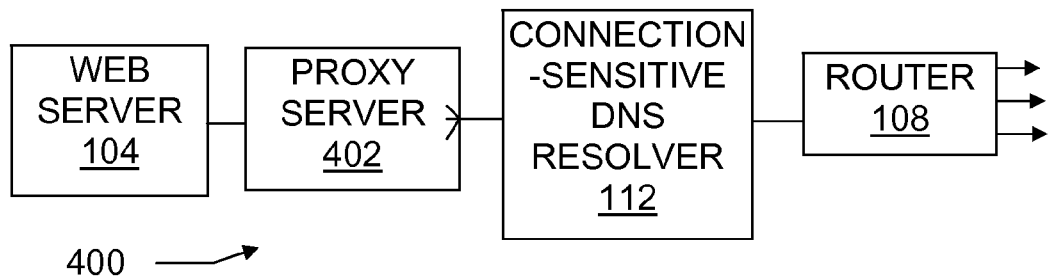
FIG. 4 is a diagram illustrating an alternative system according to the present invention, in which a proxy server having several assigned IP addresses is positioned between the web server and the connection-sensitive DNS resolver.
Figure 5:
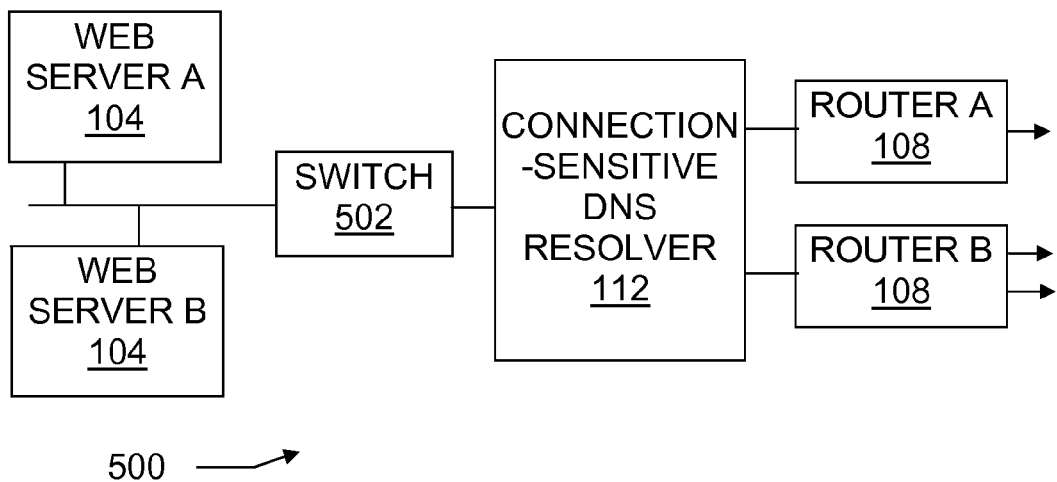
FIG. 5 is a diagram illustrating an alternative system according to the present invention, in which the connection-sensitive DNS resolver resolves IP addresses for a switch, which in turn selects between multiple web servers for the hosted web site.
Figure 6:
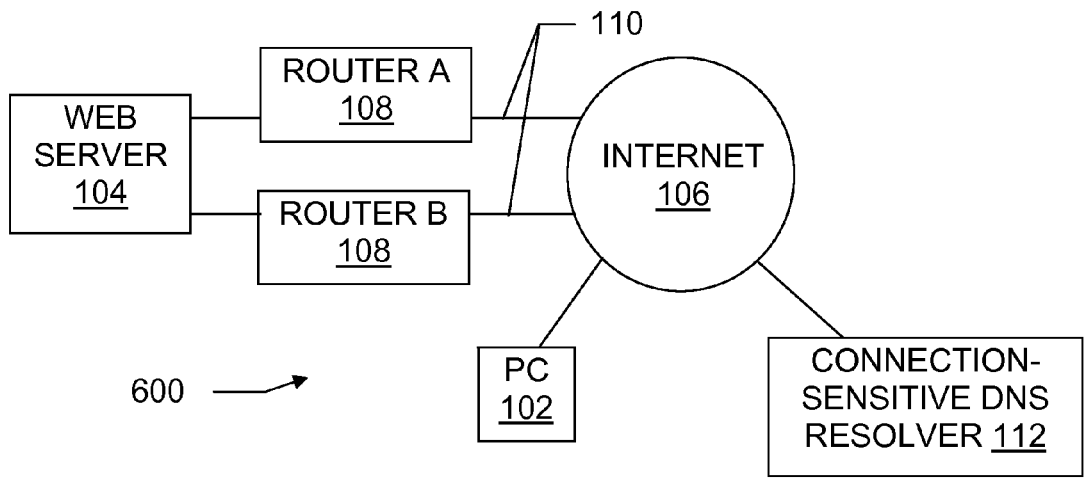
FIG. 6 is a diagram illustrating an alternative system according to the present invention, in which the connection-sensitive DNS resolver is not positioned between the web server and its router(s); this feature distinguishes FIG. 6 and other inventive systems from the systems shown in previous Figures, because systems like those in FIGS. 1-5 have the DNS resolver positioned between the web server(s) and router(s).

It will also be appreciated that the DNS resolver 112 need not connect directly to a server 104. The DNS resolver 112 may connect instead to a proxy server 402, as shown in FIG. 4, to a LAN, or to a server multiplexer 502, as shown in FIG. 5, for instance. In FIG. 5, the servers A and B may be multi-homed. As shown in FIG. 6, some connection-sensitive DNS resolvers 112 may not be positioned between the web server 104 and its router(s) 108 at all. Like some conventional DNS resolvers, these resolvers 112 may instead be positioned elsewhere, so long as they connect to the Internet 106. There are some advantages to placing the resolver 112 between the server(s) and the router(s): since the traffic to the server(s) goes through the resolver 112, the resolver 112 can be used to do multiplexing, packet shaping, Quality of Service tasks such as favoring voice-over-IP traffic, and other direct traffic management functions, which would not be possible if the resolver 112 was positioned elsewhere. By contrast, if the resolver does not reside between the server and router then the resolver does not get involved in direct traffic management but still resolves names into IP addresses. When the resolver 112 is not located between the server(s) and the router(s), the resolver maintains tables or other data structures with information such as IP addresses to reply to, the status of load and router connections, and other information discussed herein. The resolver 112 may also use route test algorithms, and may maintain information on link characteristics such as latency and/or line speed. Based on statistics, the resolver 112 redirects the requests to appropriate servers.

In the configurations shown in FIGS. 1-5, the connection-sensitive DNS resolvers 112 is located between one or more web servers 104 and one or more routers 108. Since the routers' addresses are known, in these configurations the DNS resolver 112 may be combined in one device with a multiplexer/demultiplexer for using multiple lines or connections to provide greater throughput. In a given situation, suitable mux/demux devices and techniques may include without limitation those available from Ragula Systems Development company and/or those described in U.S. Pat. No. 6,295,276, U.S. Pat. No. 6,253,247, or U.S. patent application Ser. No. 09/751,590, which are incorporated herein.

By contrast, in the configuration of FIG. 6, the DNS resolver 112 is not located between the web server 104 and its closest routers 108 but is instead accessible through the Internet 106. Accordingly, the mux/demux functionality may be located in a different device than the DNS resolver functionality. In short, a smart DNS resolver module 112 of the present invention may be combined with a mux/demux device, but need not be so combined.

Figure 7:
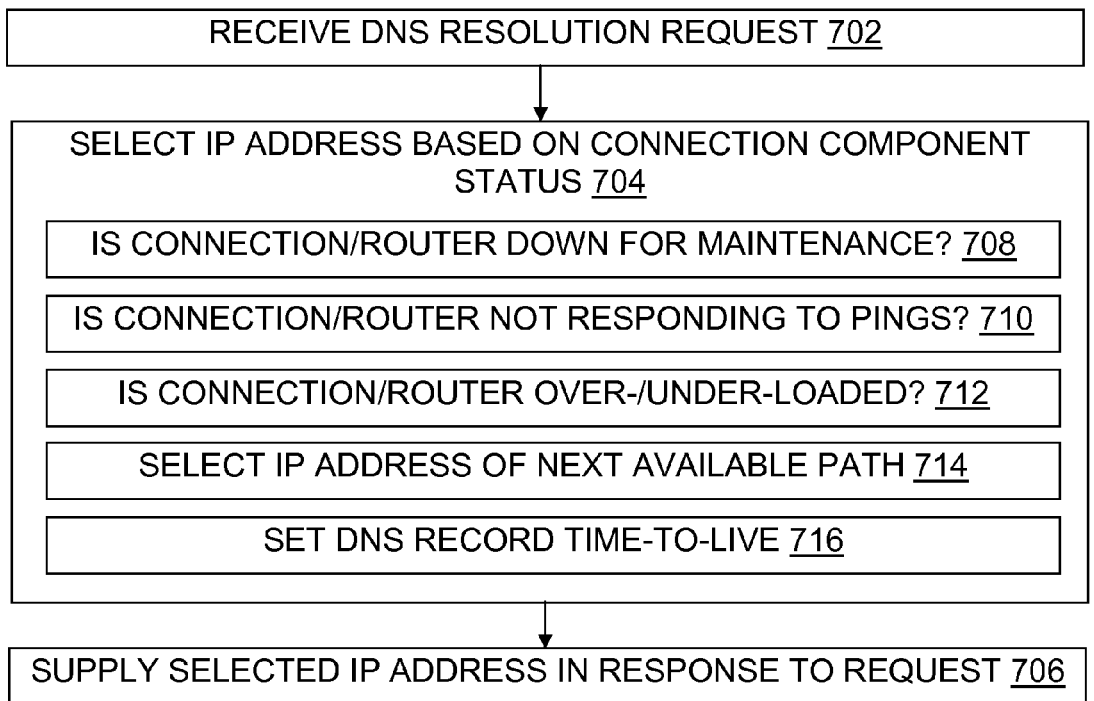
FIG. 7 is a flowchart illustrating methods of the present invention for resolving domain names into IP addresses in a manner that reflects the condition of routers and network links, as opposed to DNS resolution based on the condition of web servers.

FIG. 7 is a flowchart illustrating methods of the present invention for resolving domain names into IP addresses in a manner that reflects the condition of routers and network links, as opposed to performing conventional DNS resolution based on the condition of web servers. Unless it is otherwise indicated, the description herein of systems of the present invention extends to corresponding methods, and vice versa. Likewise, the description of methods informs article embodiments which comprise storage media configured to perform methods of the invention.

The present invention operates in conjunction with one or more DNS servers. The present device can work as an independent DNS resolver in a contained environment such as a private network, or a frame relay network. In case the internet, there are sometimes several geographically distributed DNS servers; they may be arranged in a tree hierarchy. These DNS servers query each other periodically to get the latest list of names and addresses. When a server does not have information about a name, it forwards the request to the next server above it in the tree till the name is resolved or, at the top of the tree, an error message is generated. Embodiments of the invention effectively include at least one DNS server, so the module 112 itself can operates as an inbound DNS server. Use of an additional DNS server may be preferred, however, to prevent conventional DNS activity from interfering with use of the module 112 for path-sensitive load-balancing and reliability increases as described herein.

According to the invention, an inventive DNS interface module such as a resolver 112 receives a 702 domain name resolution request, selects 704 at least one IP address from a group of addresses corresponding to that domain name, and responds 706 to the request with an IP address. The "smart" DNS module 112 is configured with multiple IP addresses associated with each server, to reflect the potentially available paths to the server. The module 112 preferably checks periodically the actual availability of the paths, through pings, timeouts without acknowledgment, or other familiar means. The module keeps track of the current status of the path components; for purposes of the present invention, a server 104 is not considered a component in the path to that server. With the status information available to the DNS server, it can resolve the names of the servers intelligently by supplying IP addresses that use functioning paths, and preferably also by balancing the load on different paths.

When a request to resolve a domain name into an IP address is received 702 at the inventive DNS interface module, that module selects 704 an IP address from its database 114 for response. With respect to routers, for example, the selection is made between two or more candidate IP addresses by using one or both of the following selection criteria: (a) is the router 108 responding on the selected IP address or is the router "up", that is, is it operating? (b) is the router associated with the IP address under-loaded 712, that is, does it have less data traffic than another server router? Similar questions may be asked about other path components, such as links 110. In some cases equivalent criteria are used, such as (a) is a candidate server connection "down", e.g., not responding to pings 710, or known to be unavailable 708 for normal operation because it is scheduled for routine maintenance or upgrade work? (b) is a candidate server data connection overloaded 712, e.g., it has more currently active data connections to the servers than some (or all) other candidates? Some connections may be active even though no traffic is presently flowing over them, if an active life was specified and has not yet elapsed. Activity characteristics such as whether a file transfer was interrupted before completion, and/or the number of packets sent/received may be considered. The (a) criteria ask whether the router(s) 108 and the rest of the network connection in a given path are operating reliably ("reliability criterion"), while the (b) criteria ask whether the path for a given IP connection is operating at full capacity ("capacity criterion").

For instance, an inventive DNS interface module 112 may operate by receiving 702 a domain name resolution request, determining 714 in a round-robin manner which of two or more candidate IP addresses is reliable, and forwarding 706 the resolved IP address to have the client 102 use a reliable path to the server. That is, the module 112 resolves 714 the resolution request to the reliable (path available) IP address associated with the server 104 which appears next in a list of IP addresses after the IP address sent when the previous resolution request was resolved by the module.

Alternately, the module 112 may receive 702 a resolution request, determine which candidate IP connection paths are reliable, determine 712 which of those network connections is least heavily loaded, and then resolve the request by selecting 704 the least heavily loaded IP connection to the server 104. The least heavily loaded IP address may be chosen according to a path dynamic load-balancing criterion involving data 114 such as average number of requests received, available router 108 memory, or average turnaround time for packets sent over paths selected using previous domain name resolution results.

The inventive module may also resolve domain name resolution requests in order to spread traffic among paths by using reliability as the distribution criterion without any particular attention to load-balancing as a distribution criterion. For instance, the module may resolve the request to whichever router IP address is closest, or next in line, or otherwise the easiest choice, if that router IP address is up and regardless of that router's load.

Some prior approaches, such as those used in UNIX round robin DNS servers, resolve domain name resolution requests in a round robin manner regardless of whether the path is operating reliably. This simplifies the task of the component that resolves the requests, but also makes resolution failures more likely. The failure rate with such previous approaches can be dramatic. For instance, if there are three server path IP addresses but one of the paths is down, then using a round robin distribution method without regard to path reliability will result in a failure rate of about 33%; if there are only two server path IP addresses and one is down, the failure rate for client 102 access attempts will be about 50%. The present invention preferably provides smaller failure rates by having the inventive module 112 keep track of which paths are reliable, or at least having the module check for connection reliability by pinging over the path just before resolving a name request. With the invention, resolution requests should not be routinely resolved to non-working IP connections. A round robin approach may be used by module 112, but unlike prior approaches the inventive round robin approach will not provide a response that would otherwise be next in the round robin cycle, if providing that response would send traffic over a connection or path component that is apparently down.

During a step 716, the module 112 sets the time-to-live (TTL) in the DNS record it will supply 706. DNS records are often cached on Internet DNS servers after an IP address for a given domain name is supplied. The TTL influences the amount of time a given DNS record should remain in the cache of a DNS server after the IP address specified in the DNS record is first supplied. If the TTL is too short, time and bandwidth will be spent with unnecessary DNS resolutions, but if the TTL is too long, an IP address for a given path may continue being given to clients 102 long after that path becomes unavailable or over-loaded. The TTL is preferably adjustable (through an automatic trial-and-error process and/or manually by an administrator) in at least some embodiments of the module 112.

At least some aspects of the invention described here are apparently embodied in a commercial product sold by Ragula Systems (dba FatPipe) under the mark WARP. To set up DNS on a WARP product, one needs a registered domain name, and the registered DNS server names need to have IP addresses that reside on the WARP box. For greater redundancy, it is preferable that the IP addresses be provided by different Internet Service Providers (ISPs). Systems according to the invention may be used with multiple WARP boxes, with multiple ISPs, with reverse port mapping to conserve public IP addresses by mapping a given public IP address and port number on the Internet side of the WARP unit to a private IP address on the LAN side of the WARP unit, with firewall load management by placing a firewall between the WARP unit and router (servers 104 being located on the opposite side of the WARP unit), with DHCP, with internal LAN routers, with proxy ARP, and/or with other computer networking components or configurations.

The steps illustrated and discussed in this document may be performed in various orders, including concurrently, except in those cases in which the results of one step are required as input to another step. Likewise, steps may be omitted unless required by the claims, regardless of whether they are expressly described as optional in this Detailed Description. Steps may also be repeated, or combined, or named differently.

The invention may be embodied in other specific forms without departing from its essential characteristics. The described embodiments are to be considered in all respects only as illustrative and not restrictive. Headings are for convenience only. The scope of the invention is indicated by the appended claims. All changes which come within the meaning and range of equivalency of the claims are to be embraced within their scope.

What is claimed and desired to be secured by patent is:

1. A method for distributing domain name resolution results to at least two servers over at least two paths, the method comprising the steps of:
   receiving domain name resolution requests which each request an IP address corresponding to a specified domain name;
   selecting between at least two IP addresses based on at least status information of connection components which are neither servers nor clients, the connection components located on respective paths to the at least two servers;
   supplying a selected IP address in response to each request, thereby directing traffic over at least two paths through respective connection components; and
   over-loading at least one of the servers even though traffic load is distributed over at least two paths to the over-loaded server.

2. The method of claim 1, further comprising setting a domain name time-to-live value before supplying the selected IP address.

3. The method of claim 1, further comprising providing code to aid administration including at least one of the following: code for maintaining a log, code for sending an alert to a system administrator, authentication code, security code.

4. The method of claim 1, further comprising adding an address to a server for multi-homing.

5. The method of claim 1, wherein the status information includes at least one of: whether a given router answered a ping, and when a given router was last pinged.

6. The method of claim 1, wherein the status information includes at least an obtained status of a connection component which includes at least one of the following: a firewall, a bridge, a switch, a packet shaper.

7. A connection-sensitive domain name resolution device, comprising:
   a data component identifying IP addresses for at least two paths to each of at least two servers which share a domain name;
   a code component which receives a domain name resolution request specifying the domain name, selects an IP address from the data component based on information about the status of paths to the servers, and supplies the selected IP address in response to the domain name resolution request, the IP address selection based on status information about connection components on the paths, and over-loads at least one of the servers even though traffic load is distributed over at least two paths to the over-loaded server.

8. The device of claim 7, wherein IP addresses in the data component identify routers on paths to the servers, and the code component avoids selecting the IP address of a router that is on a path to a server but is not available.

9. The device of claim 7, wherein the connection component acts as at least one of the following: a firewall, a bridge, a switch, a packet shaper.

10. The device of claim 7, wherein the code component selects the IP address of an under-loaded path, thereby tending to balance the loads on the paths to the over-loaded server.

11. The device of claim 7, in combination with a router.

12. The device of claim 7, in combination with three routers on the paths to the servers.

13. A computer-readable storage medium having a configuration that will cause performance of a method for connection-sensitive domain name resolution when multiple connections to multiple web servers are potentially available, the method comprising:

receiving a domain name resolution request which requests an IP address corresponding to a specified domain name;

selecting an IP address based on status information about a connection component which is neither a server nor a client, the connection component acting instead as at least one of the following: a router, a firewall, a bridge, a switch, a packet shaper;

supplying the selected IP address in response to the request, thereby directing traffic over a path through the connection component; and over-loading one of the web servers even though traffic load is distributed over at least two paths to the over-loaded server.

14. The configured medium of claim 13, wherein the method comprises adjusting the time-to-live to be associated with a DNS record for an IP address in a path to the over-loaded server.

15. The configured medium of claim 13, wherein the method comprises providing code to aid administration including at least one of the following: code for maintaining a log, code for sending an alert to a system administrator, authentication code, security code.

16. The configured medium of claim 13, wherein the status information includes at least one of: whether a given router answered a ping, and when a given router was last pinged.

17. The configured medium of claim 13, wherein the method avoids selecting the IP address of a router that is on a path to the over-loaded server but is not available.

18. The configured medium of claim 13, wherein the method selects the IP address of an under-loaded path, thereby tending to balance the loads on the paths to the over-loaded server.

19. The configured medium of claim 13, wherein the method comprises performing a router status inquiry to determine the router's load.

20. The configured medium of claim 13, wherein the selecting step comprises determining whether a connection responds to pings.

* * * * *